Feb. 15, 1966  J. H. LEWIS  3,234,758
DRIVE SHAFT SLIP SPLINE ASSEMBLY
Original Filed Oct. 8, 1959
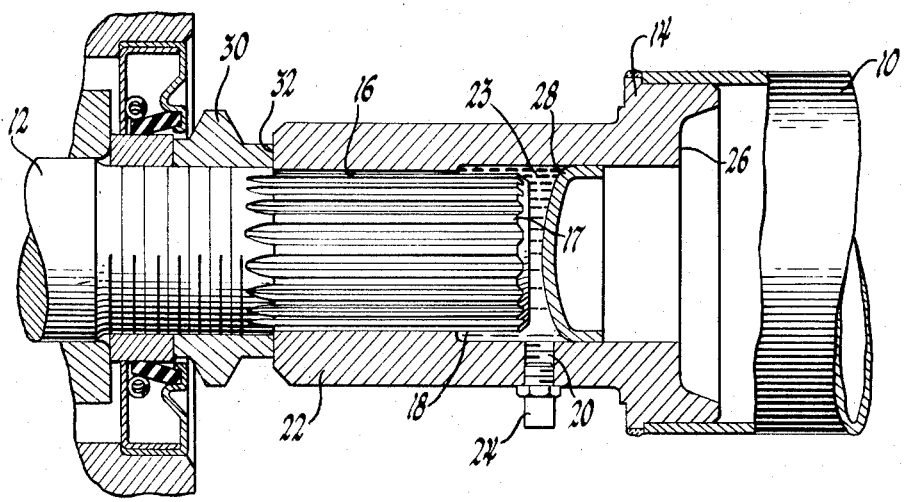
INVENTOR.
James H Lewis
BY
ATTORNEY

United States Patent Office 3,234,758
Patented Feb. 15, 1966

3,234,758
DRIVE SHAFT SLIP SPLINE ASSEMBLY
James H. Lewis, East Lansing, Mich., assignor to General Motors Corporation, Detroit, Mich., a corporation of Delaware
Original application Oct. 8, 1959, Ser. No. 845,285. Divided and this application Mar. 8, 1963, Ser. No. 270,486
8 Claims. (Cl. 64—23)

This invention relates to a high viscosity lubricant such as can be effectively employed to lubricate contacting surfaces which are subjected to extremely high load conditions.

The present patent application is a division of my copending United States application Serial No. 845,285, now abandoned, which was filed on October 8, 1959, as a continuation-in-part of United States patent application No. 691,904, now abandoned, both assigned to the assignee of the present application.

In lubricating such heavily loaded contacting surfaces, it is essential to employ a lubricant which will not be displaced from the interfacial contacting area. Lubricants of a relatively low viscosity, such as conventional low viscosity oils, are unsatisfactory for this type of application since they do not have sufficient "body" to resist being squeezed from the contacting interface under heavy compression. Higher viscosity lubricants, such as heavy oils and greases, have customarily been employed to lubricate highly loaded contacting surfaces. Under moderate load conditions a heavy oil is generally satisfactory if the contacting surfaces can be immersed in a bath of the lubricant. However, under severe load conditions conventional lubricants do not have sufficient viscosity or consistency to resist being squeezed from the contacting interface when most needed.

The ineffectiveness of conventional lubricants in lubricating highly loaded contacting surfaces is exemplified by the problems arising in the conventional lubrication of automotive propeller shaft slip splines. When set in motion, the rear wheel assembly of an automobile exhibits an initial forward movement which reduces the distance between the rear axle and transmission of the automobile. Since these two parts are connected by a rigid propeller shaft, it is necessary to incorporate a device in the shaft to lengthen and shorten it as required. The compensating device customarily employed is a relatively movable interlocking slip spline assembly.

If the slip spline assembly does not absorb the forward thrust of the rear wheel assembly, the thrust is carried to the transmission and engine jolting them forward on the engine mounts. Binding of the slip spline assembly under the high initial torque loads imposed by modern high power engines can frequently occur when the assembly is lubricated with conventional oils or greases. When the high initial torque load has diminished, the spline assembly breaks loose to relieve the stress. This action is simultaneously accompanied by the immediate return of the engine and transmission to their normal operating positions, resulting in a "klunking" sound which is highly displeasing to persons within the automobile. Moreover, although not as readily noticeable, the binding of the slip spline assembly also causes undue stress and wear on all parts of the connecting power supply system, frequently producing galling of the spline and deleteriously affecting the resilient motor mounts.

It is therefore a principal object of this invention to provide an improved lubricating composition which eliminates binding of an automotive propeller shaft slip spline assembly when under high starting torque loads. A further object of this invention is to provide a highly viscous grease-type lubricating composition containing powdered polymerized tetrafluoroethylene for use in lubricating contacting surfaces under high load conditions. A still further object of this invention is to provide a grease-type lubricating composition containing powdered polymerized tetrafluoroethylene for lubricating propeller shaft slip splines.

Briefly, the invention comprehends a lubricating composition composed substantially of a highly viscous body material, such as grease, having powdered polymerized tetrafluoroethylene homogeneously dispersed throughout the mixture.

Other objects, features and advantages of the present invention will become more obvious from the following description of preferred embodiments thereof and from the drawing which is a fragmentary sectional view showing an automobile propeller shaft slip spline assembly.

As shown in the drawing, a typical automobile propeller shaft slip spline assembly generally includes a cylindrical vehicle drive shaft 10 axially aligned with a cylindrical driving means 12. The drive shaft 10 is a tubular member having a cylindrical end piece 14 secured to one end thereof. The cylindrical end piece 14 is axially splined on its inner circumferential periphery 16. The driving means 12 possesses similar axial splines 17 on its outer circumferential periphery 18 to slidably engage the internally splined end piece 14. The splines on the driving means 12 and the end piece 14 have a lubricant between them supplied from the reservoir 23. An aperture 20 in the wall 22 of the propeller shaft end piece 14 is provided through which additional lubricant is supplied to the reservoir 23. The aperture 20 is adapted with a threaded closure plug 24 to retain the lubricant in the joint. Loss of lubricant through the open end 26 of the end piece is inhibited by a seal 28 which is provided within the end piece 14 in axial relationship with the driving means 12. Excessive axial movement of the spline assembly is limited by the annular lock nut 30 which forms an abutment for the axial face 32 of the end piece.

In accordance with the invention, an improved lubricant for such an assembly or the like is prepared by mixing a highly viscous body material with powdered polymerized tetrafluoroethylene in a manner so as to uniformly disperse the polymerized tetrafluoroethylene throughout the mixture. The powdered polymerized tetrafluoroethylene can be blended with the viscous body material in any convenient manner, such as by hand mixing or by mechanically dispersing the polymerized tetrafluoroethylene in a conventional milling operation. Mixtures containing larger proportions of the powdered polymerized tetrafluoroethylene attain an extremely viscous consistency which is difficult to blend. It is desirable, in such instances, to add the polymerized tetrafluoroethylene in small increments during the mixing to more easily obtain a uniform dispersion.

It is to be understood, of course, that the term "polymerized tetrafluoroethylene," as used herein, does not include fluorinated polymerized ethylene. Polymerized tetrafluoroethylene possesses inherent properties which are necessary to form the lubricating composition of this invention. Due to its relative inertness with respect to hydrocarbon lubricants, polymerized tetrafluoroethylene retains its particulate identity after extended periods of high temperature use in combination with a hydrocarbon lubricant. Substances such as fluorinated polymerized ethylene, which tend to dissolve in hydrocarbon lubricants at elevated operating temperatures, are particularly unsuitable since the particulate nature of the polymer is destroyed. It is the specific combination of the particulate polymerized tetrafluoroethylene and the supporting medium which provides the effectiveness of the lubricant.

Any suitable highly viscous material can be used to provide the supporting medium for the dispersed polymerized tetrafluoroethylene powder provided it does not deleteriously affect the lubricating properties of the polymerized tetrafluoroethylene. A supporting medium is required that has a sufficient consistency to maintain the polymerized tetrafluoroethylene in homogeneous dispersion during use. In most instances it is desirable to employ a conventional lubricating grease as the highly viscous supporting medium due to its inherent lubricating properties. These characteristics assist the polymerized tetrafluoroethylene in accomplishing its function, enhancing the effectiveness of the composition. By the term "grease," of course, I mean to include a semi-solid or solid combination of a petroleum product and a soap or mixture of soaps, with or without the fillers, additives, etc., suitable for certain types of lubrication. It is generally considered that any solid or semi-solid lubricant containing a thickening agent in a liquid lubricant is a grease, wherein jels of substances other than pure soaps are used as thickening agents. Most commonly at present, however, commercially available greases are basically a combination of a mineral oil base lubricant and a soap.

In general, best results were obtained when using a grease having a National Lubricating Grease Institute (NLGI) lubricating consistency grade of about Nos. 2–4. In some instances, however, as low as No. 1 NLGI grade lubricating grease or as high as No. 6 NLGI grade lubricating grease can be used. In general, I prefer to employ a No. 3 NLGI grade lubricating grease.

The exact particle size of the granulated finely divided polymerized tetrafluoroethylene is not particularly critical for many applications. However, it has been found that a granulated finely divided powder having a particle size in which substantially all of the particles will pass a 20 mesh screen and be substantially retained by a 100 mesh screen is generally satisfactory. A lubricating mixture made up in accordance with the present invention which produces excellent results when used in an automobile propeller shaft slip spline assembly, comprises a uniform mixture of a No. 3 NLGI grade grease and a granulated finely divided polymerized tetrafluoroethylene powder having a particle size in which substantially all of the particles are of a size such as will just pass about a 30 mesh screen; in other words, a particle size in which most of the particles have a maximum thickness substantially equal to the openings of about a 30 mesh screen.

Lubricating characteristics of compositions comprehended by this invention will be progressively improved for high load conditions with increasing proportions of powdered polymerized tetrafluoroethylene from small amounts up to approximately 50%. However, in most instances, approximately 4% to 34% by weight polymerized tetrafluoroethylene powder in the lubricating composition will provide the most effective results in lubricating highly loaded contacting surfaces. Amounts of polymerized tetrafluoroethylene in the lubricating composition in proportions substantially greater than 50% by weight are generally unsuitable. In such compositions the polymerized tetrafluoroethylene powder tends to conglomerate and form compacted larger masses which inhibit efficient lubrication. Typically, it is preferred to employ approximately ⅓ by weight powdered polymerized tetrafluoroethylene with the aforementioned No. 3 consistency grease when lubricating highly loaded surfaces such as automobile slip splines.

Mixtures of polymerized tetrafluoroethylene and a supporting medium, such as grease, form a composition of a substantially greater consistency than grease alone. Mixtures containing approximately ⅓ by weight of polymerized tetrafluoroethylene and the balance substantially a viscous lubricant, such as grease, form a plastic mass of putty-like consistency. The consistency of this mass maintains the uniform dispersion of the powdered polymerized tetrafluoroethylene. Additionally, due to its highly viscous putty-like consistency, this composition is not squeezed from highly loaded contacting surfaces. Neither the grease nor the polymerized tetrafluoroethylene singly are satisfactory in this type of application. However, the coaction of these substances produces a lubricating composition which is singularly effective. This combination thus does not merely possess the additive characteristics of its components, but has completely new properties which are essential to efficient lubrication of highly loaded surfaces.

Although the present invention has been described in connection with certain specific examples thereof, it is not intended to be limited thereby except as defined in the appended claims.

I claim:

1. In a drive shaft slip spline assembly comprising a drive shaft member, a driving member engaging said drive shaft member, and adjoining ends on said members provided with interlocking engaging, axially extending splines, the improvement which comprises a lubricant between said splines comprising from a small but effective amount up to 50%, by weight, finely divided, polymerized tetrafluoroethylene uniformly dispersed in a hydrocarbon base lubricating grease, said lubricant eliminating binding of said splines when said assembly is operating under high load conditions, and means to retain said lubricating composition between said splines.

2. In a drive shaft slip spline assembly comprising a cylindrical drive shaft member, a cylindrical driving member axially aligned with said drive shaft member, and adjoining ends on said members provided with interlocking, axially extending splines, the improvement which comprises a lubricant between said splines comprising approximately 4% to 50%, by weight, granulated, finely divided, polymerized tetrafluoroethylene having a particle size in which substantially all of the particles will pass a 20 mesh screen and be substantially retained by a 100 mesh screen, and a No. 2 through a No. 4 NLGI grade lubricating grease in which said particles are uniformly dispersed, said grease compirsing a thickened mixture of a petroleum base hydrocarbon lubricant and a soap, said lubricant eliminating binding of said splines when said assembly is operating under high load conditions, and means to retain said lubricating composition between said splines.

3. In a drive shaft slip spline assembly comprising a drive shaft member, a driving member having an end engaging an adjoining end of said drive shaft member, axially extending splines being provided on the adjoining ends of said members, and said splines on said members being in axially slidable, rotatably interlocking engagement, the improvement which comprises a lubricating composition between said splines, said composition comprising from a small but effective amount up to about 50%, by weight, powdered, polymerized tetrafluoroethylene uniformly dispersed in a lubricating grease of at least No. 1 NLGI grade, said grease comprising a highly viscous petroleum base hydrocarbon lubricant, said lubricating composition being capable of lubricating said splines under high pressure operating conditions to minimize binding and wear of said splines during assembly operation, and means to retain said lubricating composition between said splines.

4. In a drive shaft slip spline assembly comprising a cylindrical drive shaft member, a cylindrical driving member having an end engaging an adjoining end of said drive shaft member, axially extending splines being provided on the adjoining ends of said members, and said splines on said members being in axially slidable, rotatably interlocking engagement, the improvement which comprises a lubricating composition between said splines, said composition comprising from about 4% to about 50%, by weight, finely divided, granulated polymerized tetrafluoroethylene uniformly dispersed and suspended in a lubricating grease of at least No. 1 NLGI grade, and grease comprising a thickened petroleum base hydrocarbon lubricant, said lubricating composition being capable of lubricating said splines under high pressure operating conditions to minimize binding and wear of said splines during assembly operation, and means to retain said lubricating composition between said splines.

5. In a drive shaft slip spline assembly comprising a cylindrical rotatable drive shaft member, a cylindrical rotatabled riving member having an end coaxially aligned with and mechanically engaging an end of said drive shaft member, axially extending splines being provided on the engaging ends of each of said members, and said splines on said members being in axially slidable, rotatably interlocking engagement, the improvement which comprises a lubricating composition between said splines, said composition comprising about 4% to about 34%, by weight, of powdered, polymerized tetrafluoroethylene having a particle size in which substantially all of the particles will pass through a 20 mesh screen and be substantially retained by a 100 mesh screen, said particles being uniformly dispersed and suspended in a No. 1 through a No. 6 NLGI grade lubricating grease, said grease being a thickened mixture of a petroleum base hydrocarbon fluid and a soap, said lubricating composition being capable of lubricating said splines under high pressure operating conditions to minimize binding and wear of said splines during assembly operation.

6. In a drive shaft slip spline assembly comprising a drive shaft member having an opening defined by walls in one end thereof, axially extending splines being provided on said walls, a driving member having one end thereof extending into said opening, and axially extending splines being provided on said end of said driving member so that said splines on said driving member are in axially slidable, rotatably interlocking engagement with said splines on said opening-defining walls of said drive shaft member, the improvement which comprises a lubricating composition between said splines, said composition comprising about 4% to 50%, by weight, of granulated, finely divided, polymerized tetrafluoroethylene uniformly dispersed and suspended in a highly viscous hydrocarbon base supporting medium, said lubricating composition being capable of lubricating said splines under high pressure operating conditions to minimize binding and wear of said splines during assembly operation, and means to retain said lubricating composition between said splines.

7. In a drive shaft slip spline assembly comprising a drive shaft member having an opening defined by walls in one end thereof, axially extending splines being provided on said walls, a driving member having one end thereof extending into said opening, and axially extending splines being provided on said end of said driving member so that said splines on said driving member are in axially slidable, rotatably interlocking engagement with said splines on said opening-defining walls of said drive shaft member, the improvement which comprises a lubricating composition between said splines, said composition comprising, by weight, approximately ⅓ granulated, finely divided, polymerized tetrafluoroethylene having a particle size which will just pass through a 30 mesh screen and about ⅔ of No. 3 grade NLGI lubricating grease, said grease being a thickened mixture of a petroleum base hydrocarbon fluid and a soap, said polymerized tetrafluoroethylene particles being uniformly dispersed in said grease, said lubricating composition being capable of lubricating said splines under high pressure operating conditions to minimize binding and wear of said splines during assembly operation.

8. In a drive shaft slip spline assembly comprising a cylindrical drive shaft member having an opening defined by walls in one end thereof, axially extending splines provided on said walls and inwardly projecting into said opening, a cylindrical driving member coaxially aligned with said drive shaft member and having one end thereof extending into said opening, axially extending splines being provided on said end of said driving member and projecting radially outward therefrom so that said splines on said driving member are in axially slidable, rotatably interlocking, high-pressure engagement with said splines on said opening-defining walls of said drive shaft member, and a lock nut on said driving member adapted to abut said drive shaft member for limiting the axial extension of said driving member into said opening in said drive shaft member so that a portion of said opening functions as a lubricant reservoir, the improvement which comprises a polymerized tetrafluoroethylene-grease lubricating mixture in said reservoir, said mixture comprising about 4% to 50%, by weight, of finely divided, polymerized tetrafluoroethylene uniformly dispersed in a thickened petroleum base hydrocarbon lubricating grease having a viscosity at least as great as the vicosity of No. 1 NLGI grade lubricating grease, said lubricating composition eliminating binding of said splines when said assembly is operating under high pressure conditions, and a seal member positioned in said opening in said drive shaft member for maintaining said lubricating composition in said reservoir and between said splines.

References Cited by the Examiner

UNITED STATES PATENTS

| | | | |
|---|---|---|---|
| 1,496,236 | 6/1924 | Laughlin | 64—23 |
| 1,612,322 | 12/1926 | Spicer | 64—17 |
| 2,107,721 | 2/1938 | Swenson | 64—23 |
| 3,069,387 | 12/1962 | Allen et al. | 252—58 |

FOREIGN PATENTS 664,546   1/1952   Great Britain.

MILTON KAUFMAN, *Primary Examiner.*
ROBERT C. RIORDON, *Examiner.*